UNITED STATES PATENT OFFICE.

HORACE H. DAY, OF NEW YORK, N. Y.

IMPROVEMENT IN THE MANUFACTURE OF ELASTIC CLOTH.

Specification forming part of Letters Patent No. 28,456, dated May 29, 1860.

*To all whom it may concern:*

Be it known that I, HORACE H. DAY, of the city, county, and State of New York, have invented a new and useful description of Elastic Cloth, which I term "Gum-Faced Double Stockinet Elastic;" and I do hereby declare that the following is a full, clear, and exact description thereof and of the manner of making the same.

The object of my invention is to obtain a low-priced elastic cloth, possessing great elasticity, and also a surface resembling in appearance morocco or other leather, and which does not curl at the edges when extended; and it consists in a compound fabric consisting of two sheets of looped fabric or stockinet goods, of a layer of gum inclosed between them, and of a coating of gum on the outer side of one sheet of stockinet, the whole combined together and constituting one compound fabric.

My new elastic cloth may be manufactured in various ways, depending upon the condition of the gum or the machinery employed, or upon both. I prefer to form it of unvulcanized india-rubber, and to effect the vulcanization after the parts of the fabric are combined together. The gum for the purpose is prepared in the usual manner for vulcanizing by grinding it with the customary quantity of sulphur, and the gum compound thus made is spread upon a sheet of stockinet goods. A second sheet of stockinet goods is then applied to the surface of the gum, and if the compound fabric is to have but one gum surface a coating of unvulcanized gum compound is applied to the exterior surface of one of the sheets of stockinet; or each sheet of stockinet may be coated with a coating of unvulcanized gum compound, and then the two sheets so coated may be pressed together with one of the coatings of gum compound between the two, leaving the other on one of the outer sides of the compound fabric. After the parts of the fabric are united together the compound fabric is heated in the usual manner until the vulcanization of the gum compound is completed.

In manufacturing my new elastic cloth I prefer to use hot calender-rollers for spreading the vulcanizable gum compound upon the cloth; but as the construction and use of such rollers is well known in the manufacture of india-rubber and gutta-percha articles I do not deem it necessary to describe them herein. The sheets of stockinet goods used should be prepared previously for the purpose by coating them on the side or sides to which the gum is to be applied with a thin sizing of india-rubber composition consisting of india-rubber dissolved in camphene and applied in the manner usual in the coating of covering cloths with cement for the manufacture of elastic cloths. The gum between the two sheets of stockinet goods should be sufficiently thick to impart the necessary elasticity to the fabric, and it may, if preferred, be divided into strands, in the manner described in the patent granted to me the 23d day of August, 1859, and numbered 25,180. The gum upon the outer surface of the fabric should be spread as thinly as possible upon the stockinet goods.

Having thus described my invention, I deem it proper to state that I am aware that an elastic cloth with a gum surface has been previously manufactured, consisting of a sheet of stockinet goods and a sheet of elastic gum; but this description of cloth is defective on account of curling at the edges when extended, whereas my fabric is free from this defect. I am also aware that an elastic cloth has been made which consists of two sheets of stockinet goods inclosing elastic gum between them. I do not claim therefore to be the first inventor of a compound fabric composed of elastic gum and stockinet goods; nor do I claim any means or process of vulcanizing elastic gum; nor do I limit my invention to any peculiar process for manufacturing the article herein claimed; but

What I claim as my invention, and desire to secure by Letters Patent, is—

The new elastic cloth herein described, consisting of stockinet goods and elastic gum so combined that two sheets of stockinet goods are connected by elastic gum, and the outer face of the fabric presents a gum surface, the said elastic cloth being a new article of manufacture.

In testimony whereof I have hereunto subscribed my name.

HORACE H. DAY.

Witnesses:
   W. J. A. FULLER,
   JAMES C. GATES.